(12) United States Patent
Zhang

(10) Patent No.: US 9,824,666 B2
(45) Date of Patent: Nov. 21, 2017

(54) SMART BRACELET DISPLAY CONTROL SYSTEM AND SMART BRACELET

(71) Applicant: BOE TECHNOLOGY GROUP CO., LTD., Beijing (CN)

(72) Inventor: Zhiguo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 14 days.

(21) Appl. No.: 14/646,134

(22) PCT Filed: Apr. 14, 2015

(86) PCT No.: PCT/CN2015/076556
§ 371 (c)(1),
(2) Date: May 20, 2015

(87) PCT Pub. No.: WO2016/045362
PCT Pub. Date: Mar. 31, 2016

(65) Prior Publication Data
US 2016/0260418 A1 Sep. 8, 2016

(30) Foreign Application Priority Data
Sep. 26, 2014 (CN) .......................... 2014 1 0505339

(51) Int. Cl.
*G09G 5/38* (2006.01)
*A44C 5/00* (2006.01)
(Continued)

(52) U.S. Cl.
CPC ................. *G09G 5/38* (2013.01); *A44C 5/00* (2013.01); *G06F 1/163* (2013.01); *G06F 1/1694* (2013.01);
(Continued)

(58) Field of Classification Search
CPC ......... G09G 5/38; G06F 1/163; G06F 3/0346; G06F 3/0416; G06F 3/0412; G06F 3/04883; G06F 2200/1614
See application file for complete search history.

(56) References Cited

U.S. PATENT DOCUMENTS 6,704,007 B1 * 3/2004 Clapper ................ G06F 1/1616
345/204
2004/0098193 A1 5/2004 Kageyama
(Continued)

FOREIGN PATENT DOCUMENTS

CN 1161516 A 10/1997
CN 1649430 A 8/2005
(Continued)

OTHER PUBLICATIONS

Second Chinese Office Action dated Feb. 15, 2016, Appln. No. 201410505339.7.
(Continued)

*Primary Examiner* — Liliana Cerullo
(74) *Attorney, Agent, or Firm* — Ladas & Parry LLP

(57) ABSTRACT

A smart bracelet display control system and a smart bracelet. The smart bracelet display control system comprises a processing module, a position detecting module, a displaying module and a storing module, the position detecting module is configured to detect current position information of itself; the storing module is configured to store a correspondence relationship between set position information of the position detecting module and a display position of the displaying module; the processing module is configured to determine a current display position of the displaying module according to the correspondence relationship and the current position information; and the displaying module is configured to display content to be displayed according to the current display position. The present disclosure does not (Continued)

need a user to rotate the bracelet to change the position of the display screen, and is capable of facilitating the user to view the display content.

12 Claims, 4 Drawing Sheets

(51) Int. Cl.
*G06F 1/16* (2006.01)
*G06F 3/0346* (2013.01)
*G06F 3/041* (2006.01)
*G06F 3/0488* (2013.01)
*G09G 3/00* (2006.01)

(52) U.S. Cl.
CPC .......... *G06F 3/0346* (2013.01); *G06F 3/0412* (2013.01); *G06F 3/0416* (2013.01); *G06F 3/0488* (2013.01); *G06F 3/04883* (2013.01); *G09G 3/00* (2013.01); *A44C 5/0015* (2013.01); *G06F 2200/1614* (2013.01); *G06F 2200/1637* (2013.01); *G09G 2340/0464* (2013.01)

(56) References Cited

U.S. PATENT DOCUMENTS

| | | | |
|---|---|---|---|
| 2005/0174302 | A1 | 8/2005 | Ishii |
| 2007/0261439 | A1 | 11/2007 | Moy |
| 2009/0164219 | A1* | 6/2009 | Yeung .................. G04C 3/002 704/258 |
| 2012/0159988 | A1 | 6/2012 | Baird et al. |
| 2013/0222271 | A1* | 8/2013 | Alberth .................. G06F 1/163 345/173 |
| 2013/0285922 | A1* | 10/2013 | Alberth, Jr. ........... G06F 1/1694 345/173 |

FOREIGN PATENT DOCUMENTS

| | | |
|---|---|---|
| CN | 1649474 A | 8/2005 |
| CN | 1649474 A | 8/2005 |
| CN | 101769751 A | 7/2010 |
| CN | 201640720 U | 11/2010 |
| CN | 104223613 A | 12/2014 |
| GB | 1378620 A | 12/2003 |
| JP | 2006-171412 A | 6/2006 |

OTHER PUBLICATIONS

International Search Report and Written Opinion both dated Jul. 1, 2015; PCT/CN2015/076556.
International Search Report Appln. No. PCT/CN2015/076556; dated Jul. 1, 2015.
Written Opinion of the International Searching Authority Appln. No. PCT/CN2015/076556; dated Jul. 1, 2015.
First Chinese Office Action Appln. No. 201410505339.7; dated Jun. 10, 2015.

* cited by examiner

SMART BRACELET DISPLAY CONTROL SYSTEM AND SMART BRACELET

TECHNICAL FIELD

The present disclosure relates to the display field, in particular, to a smart bracelet display control system and a smart bracelet.

BACKGROUND

In recent years, wearable devices have become gradually popular among users due to their characteristics of being easy to wear and being convenient for a user to use anytime. Currently, there are different forms of wearable electronic devices such as glasses, hat brims and bracelets and the like. As a common wearable smart device, the smart bracelet enables the user to view and record real time data of exercising and sleeping and so on in daily routine in real time and to synchronize these data with other electronic devices, which raises life quality of people greatly.

However, as a display screen of the existing smart bracelet has a relatively fixed position on the smart bracelet and the position of the smart bracelet will always change in the moving process of the user, it requires to rotate the display screen of the smart bracelet to the direction rightly towards eyes when the user needs to view the display content, thereby causing inconvenience for the user.

SUMMARY

The present disclosure provides a smart bracelet display control system and a smart bracelet, which are capable of facilitating the user to view the display content.

According to an embodiment of the present disclosure, there is provided a smart bracelet display control system, comprising a processing module, a position detecting module, a displaying module and a storing module; the position detecting module is configured to detect current position information of itself; the storing module is configured to store a correspondence relationship between set position information of the position detecting module and a display position of the displaying module; the processing module is configured to determine a current display position of the displaying module according to the correspondence relationship and the current position information; and the displaying module is configured to display content to be displayed according to the current display position.

Further, the processing module comprises a first inquiring unit and a first display position acquiring unit; the first inquiring unit is configured to look up set position information that matches with the current position information in the correspondence relationship; and the first display position acquiring unit is configured to take a display position corresponding to the looked-up set position information as the current display position of the displaying module.

Further, the first inquiring unit takes set position information closest to the current position information as the matched set position information.

Further, the processing module comprises a second inquiring unit, a second display position acquiring unit and a calculating unit; the second inquiring unit is configured to look up set position information closest to the current position information in the correspondence relationship; the second display position acquiring unit is configured to take the looked-up set position information as reference position information and acquire a display position corresponding to the reference position information as a reference display position; and the calculating unit is configured to calculate and obtain a current display position of the displaying module according to the current position information, the reference position information and the reference display position.

Further, the calculating unit comprises a first calculating sub-unit and a second calculating sub-unit; the first calculating sub-unit is configured to calculate a relative position relationship of the current position information and the reference position information; and the second calculating sub-unit is configured to calculate the current display position of the displaying module according to the relative position relationship and the reference display position.

Further, the smart bracelet display control system further comprises a touching module, and the processing module further comprises a correspondence relationship acquiring unit; the touching module is configured to detect touch position information of a user; the correspondence relationship acquiring unit is configured to establish the correspondence relationship based on the current position information of the position detecting module and the touch position information.

According to an embodiment of the present disclosure, there is further provided a smart bracelet comprising a processor, a three-axis accelerometer, a ring-shaped display layer and a storage; the three-axis accelerometer is configured to detect current position information of itself; the storage is configured to store a correspondence relationship between set position information of the three-axis accelerometer and a display position of the ring-shaped display layer; the processor is configured to determine a current display position of the ring-shaped display layer according to the correspondence relationship and the current position information; and the ring-shaped display layer is configured to display content to be displayed according to the current display position.

Further, the processor comprises a first inquiring unit and a first display position acquiring unit; the first inquiring unit is configured to look up set position information that matches with the current position information in the correspondence relationship; and the first display position acquiring unit is configured to take a display position corresponding to the looked-up set position information as the current display position of the displaying module.

Further, the first inquiring unit takes set position information closest to the current position information as the matched set position information.

Further, the processor comprises a second inquiring unit, a second display position acquiring unit and a calculating unit; the second inquiring unit is configured to look up set position information closest to the current position information in the correspondence relationship; the second display position acquiring unit is configured to take the looked-up set position information as reference position information and acquire a display position corresponding to the reference position information as a reference display position; and the calculating unit is configured to calculate and obtain the current display position according to the current position information, the reference position information and the reference display position.

Further, the calculating unit comprises a first calculating sub-unit and a second calculating sub-unit; the first calculating sub-unit is configured to calculate a relative position relationship of the current position information and the reference position information; and the second calculating sub-unit is configured to calculate the current display position according to the relative position relationship and the reference display position.

Further, the smart bracelet further comprises a ring-shaped touch layer sheathed with the ring-shaped display layer, and the processor further comprises a correspondence relationship acquiring unit; the ring-shaped touch layer is configured to detect touch position information of a user; the correspondence relationship acquiring unit is configured to establish the correspondence relationship based on the current position information of the three-axis accelerometer and the touch position information of the ring-shaped touch layer.

Further, the smart bracelet further comprises a flexible circuit board, on which the processor and the three-axis accelerometer are arranged.

Further, the flexible circuit board is ring-shaped. The ring-shaped touch layer is disposed between the flexible circuit board and the ring-shaped display layer.

In the embodiment of the present disclosure, the correspondence relationship between the set position information of the position detecting module and the display position of the displaying module is pre-stored. When it is required to view the display content, the position detecting module detects in real time the current position information of itself, and then the processing module determines in real time the current display position of the display screen according to the pre-stored correspondence relationship and the detected position information, so that when the smart bracelet is rotated and a previous display position of the display screen is unsuitable for eyes to view, the display position of the display screen will be adjusted automatically without manually changing the position of the display screen by the user, so as to facilitate the user to view the display content.

DETAILED DESCRIPTION

Specific implementations of the present disclosure will be described in detail by combining with the accompanying figures and embodiments. The following embodiments are used to describe the present disclosure, but not used to limit the scope of the present disclosure.

Figure 1:
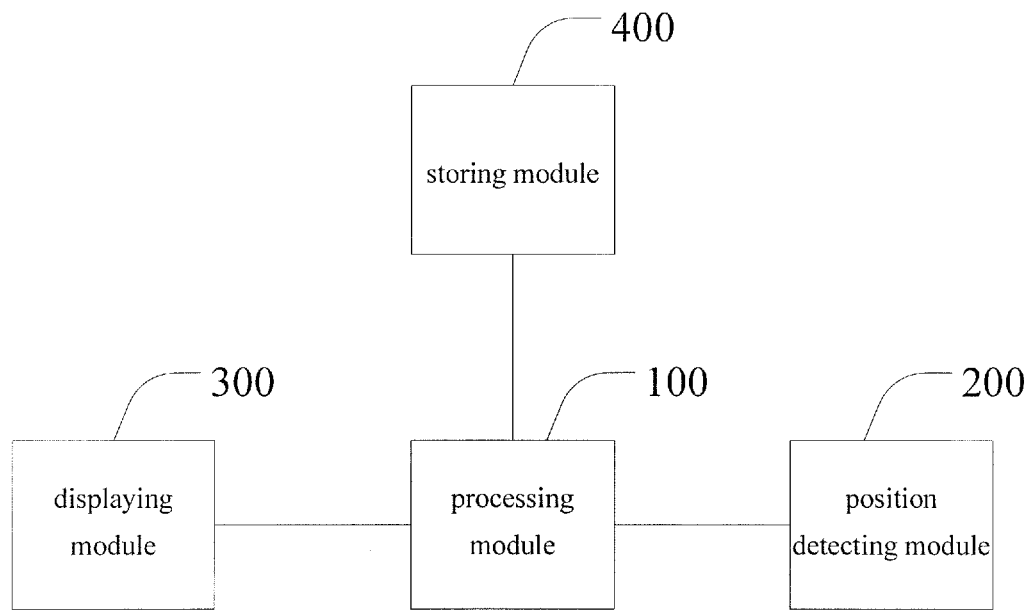
FIG. 1 is a schematic block diagram of a smart bracelet display control system provided in an embodiment of the present disclosure.

FIG. 1 is a schematic block diagram of a smart bracelet display control system provided in an embodiment of the present disclosure. The smart bracelet display control system comprises a processing module 100, a position detecting module 200, a displaying module 300 and a storing module 400.

The position detecting module 200 is configured to detect current position information of itself The storing module 400 is configured to store a correspondence relationship between set position information of the position detecting module 200 and a display position of the displaying module.

The processing module 100 is configured to determine a current display position of the displaying module according to the correspondence relationship and the current position information.

The displaying module 300 is configured to display content to be displayed according to the current display position.

The smart bracelet display control system provided in the embodiment of the present disclosure pre-stores the correspondence relationship between the set position information of the position detecting module and the display position of the displaying module. When it is required to view the display content, the position detecting module detects in real time the current position information of itself, and then the processing module determines in real time the current display position according to the pre-stored correspondence relationship and the detected position information, which does not need the user to rotate the bracelet to change the position of the display screen, so as to facilitate the user to view the display content.

In the smart bracelet display control system provided in the implementation of the present disclosure, the processing module can determine the current display position of the displaying module in many manners, for example, the processing module can determine the current display position of the displaying module in a first manner or a second manner.

First Manner:

The processing module comprises a first inquiring unit and a first display position acquiring unit.

The first inquiring unit is configured to look up set position information that matches with the current position information in the correspondence relationship. The first display position acquiring unit is configured to take a display position corresponding to the looked-up set position information as the current display position of the displaying module.

It should be noted that the current position information and the set position information can be in a one-to-one correspondence relationship. In order to save the cost, the current position information and the set position information can be in a many-to-one correspondence relationship, that is, a plurality of current position information are corresponding to one set position information. For example, position information of a plurality of positions within a position range is corresponding to one set position information. Optionally, the first inquiring unit takes set position information closest to the current position information as the matched set position information, and the first display position acquiring unit takes the looked-up set position information as a preferable position information, and takes a display position corresponding to the preferable position information as the current display position of the displaying module.

Second Manner:

The processing module comprises a second inquiring unit, a second display position acquiring unit and a calculating unit.

The second inquiring unit is configured to look up set position information closest to the current position information in the correspondence relationship.

The second display position acquiring unit is configured to take the looked-up set position information as reference position information and acquire a display position corresponding to the reference position information as a reference display position.

The calculating unit is configured to calculate and obtain a current display position of the displaying module according to the current position information, the reference position information and the reference display position.

Herein, the calculating unit comprises a first calculating sub-unit and a second calculating sub-unit.

The first calculating sub-unit is configured to calculate a relative position relationship of the current position information and the reference position information.

The second calculating sub-unit is configured to calculate the current display position of the displaying module according to the relative position relationship and the reference display position.

Preferably, the smart bracelet display control system further comprises a touching module, and the processing module further comprises a correspondence relationship acquiring unit.

The touching module is configured to detect touch position information of a user.

The correspondence relationship acquiring unit is configured to establish the correspondence relationship based on the current position information of the position detecting module and the touch position information. For example, the correspondence relationship acquiring unit takes the touch position information as the current display position of the displaying module, and establishes the correspondence relationship by using the current position information of the position detecting module and the current display position, the touch position information is corresponding to the position information (i.e., the current position information) of the position detecting module at the same time in the correspondence relationship.

In particular, the user can establish a correspondence relationship between the position information of the position detecting module and the display position of the displaying module through the touching module and the correspondence relationship acquiring unit. In particular, the user touches a device surface of the touching module by hand, the user's touch position is corresponding to the display position of the displaying module, and the correspondence relationship acquiring unit records the touch position and the position information of the position detecting module at this time and matches the above two to establish the correspondence relationship between the position information of the position detecting module and the display position of the displaying module. After multiple times of touching, respective display positions of the displaying module can be matched with the corresponding position information of the position detecting module, so as to form a complete correspondence relationship between the detecting position information (of the position detecting module) and the display position information (of the displaying module). Then, the processing module can change automatically the current display position of the displaying module according to the current position information of the position detecting module based on the above correspondence relationship, so as to facilitate the user to view the display content.

Figure 2:
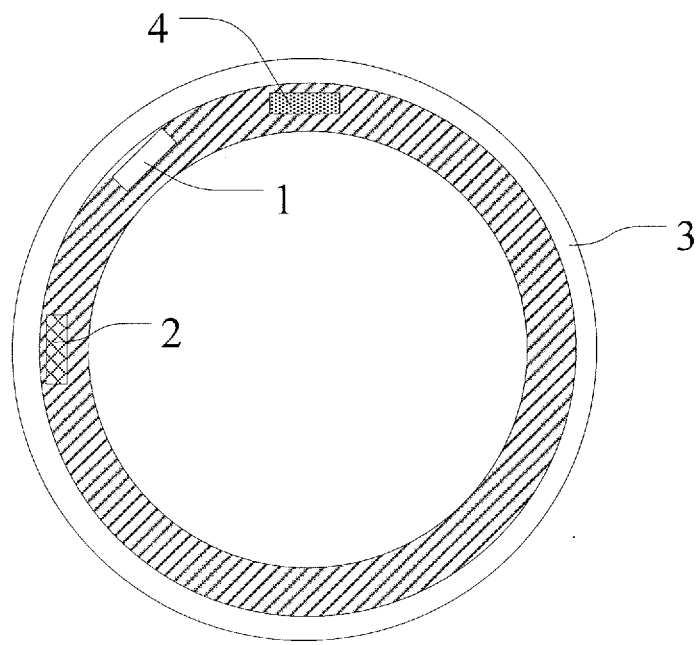
FIG. 2 is schematic diagram of a smart bracelet provided in an embodiment of the present disclosure.

For example, for the smart bracelet display control system in the above embodiment, the position detecting module can be a three-axis accelerometer. The displaying module can be a ring-shaped display layer. Referring to FIG. 2, FIG. 2 is a schematic diagram of a smart bracelet provided in an embodiment of the present disclosure. The smart bracelet comprises a processor 1, a three-axis accelerometer 2, a ring-shaped display layer 3 and a storage 4.

The three-axis accelerometer 2 is configured to detect current position information of itself.

The storage 4 is configured to store a correspondence relationship between set position information of the three-axis accelerometer, and a display position of the ring-shaped display layer.

The processor 1 is configured to determine a current display position of the ring-shaped display layer according to the correspondence relationship and the current position information.

The ring-shaped display layer 3 is configured to display content to be displayed according to the current display position. In the smart bracelet provided in the embodiment of the present disclosure, by setting the display layer of the smart bracelet as a ring shape and pre-storing the correspondence relationship between the position information of the three-axis accelerometer and the display position of the ring-shaped display layer in the storage, the display position of the display layer can be changed in real time according to the current position of the three-axis accelerometer, so as to facilitate the user to view the display content.

Figure 3:
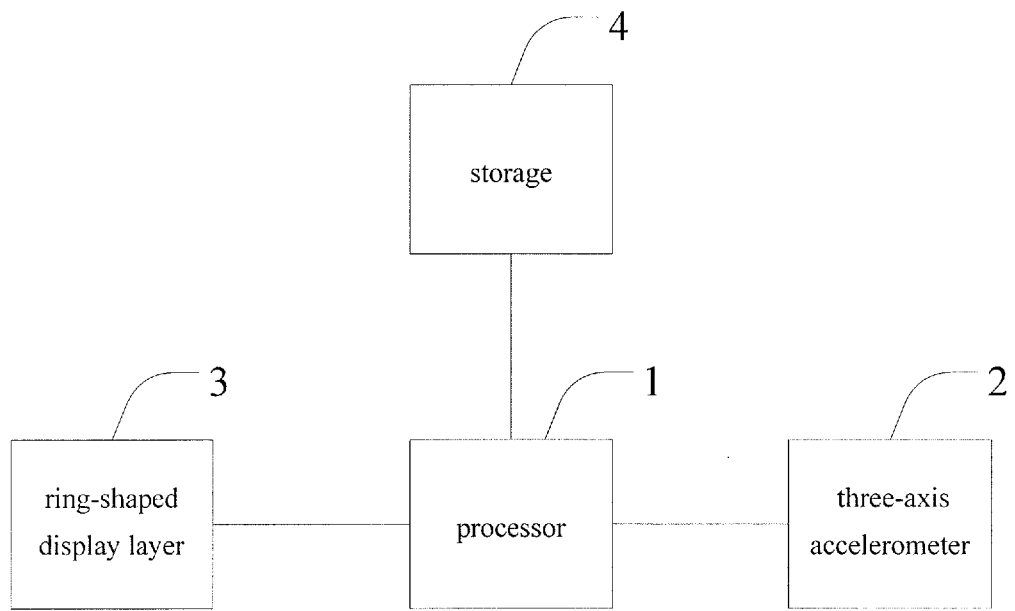
FIG. 3 is a schematic diagram of a connecting relationship of respective components in a smart bracelet provided in an embodiment of the present disclosure.

In the embodiment of the present disclosure, the ring-shaped display layer 3 can be a ring-shaped LED display screen. The processor 1 reads three-axis acceleration data of the three-axis accelerometer. In particular, MCU can be adopted. The MCU and the three-axis accelerometer 2 can be connected and communicate with each other via a I2C interface or a SPI interface. The connecting relationship of the respective components is as shown in FIG. 3.

Figure 4:
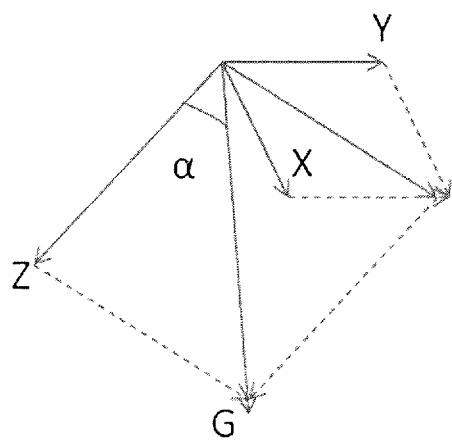
FIG. 4 is a schematic diagram of a principle of a three-axis accelerometer provided in an embodiment of the present disclosure.

For the three-axis accelerometer in the embodiment of the present disclosure, as shown in FIG. 4, the relationship of the three-axis accelerometer data and the gravity acceleration is as follows: $G^2=X^2+Y^2+Z^2$, where X, Y, Z are the three-axis acceleration data, G is the gravity acceleration, a is an included angle between the axis Z and the gravity acceleration. It can be calculated from the above formula that $\alpha=\cos(Z/G)$.

Likewise, included angles between axes X, Y and the gravity acceleration can be calculated respectively, so as to determine a placing angle of the three-axis accelerometer and obtain its current position information.

In the smart bracelet provided in the embodiment of the present disclosure, the processor 1 can determine the current display position of the ring-shaped display layer 3 in many manners. For example, the processor 1 can look up position information closest to the current position information in the correspondence relationship, and take the display position in the correspondence relationship corresponding to the closest position information as the current display position of the ring-shaped display layer 3.

In particular, the processor can comprise a first inquiring unit and a first display position acquiring unit. The first inquiring unit is configured to look up set position information that matches with the current position information in the correspondence relationship. For example, the first inquiring unit can take the set position information closest to the current position information as the matched set position information. The first display position acquiring unit is configured to take a display position corresponding to the looked-up set position information as the current display position of the displaying module. For example, the first display position acquiring unit is configured to take the looked-up set position information as preferable position information and take the display position corresponding to the preferable position information as the current display position of the displaying module.

In addition, the following manner can be adopted: looking up position information closest to the current position information in the correspondence relationship; acquiring the display position corresponding to the closest position information in the correspondence relationship; calculating and obtaining the current display position according to the current position information, the closest position information and the display position corresponding to the closest position information.

In particular, the processor 1 can comprise a second inquiring unit, a second display position acquiring unit and a calculating unit. The second inquiring unit is configured to look up set position information closest to the current position information in the correspondence relationship. The second display position acquiring unit is configured to take the looked-up set position information as reference position information and acquire a display position corresponding to the reference position information as a reference display position. The calculating unit is configured to calculate and obtain the current display position of the displaying module according to the current position information, the reference position information and the reference display position.

Herein, the calculating unit can comprise a first calculating sub-unit and a second calculating sub-unit. The first calculating sub-unit is configured to calculate a relative position relationship of the current position information and the reference position information. The second calculating sub-unit is configured to calculate the current display position of the displaying module according to the relative position relationship and the reference display position.

Figure 5:
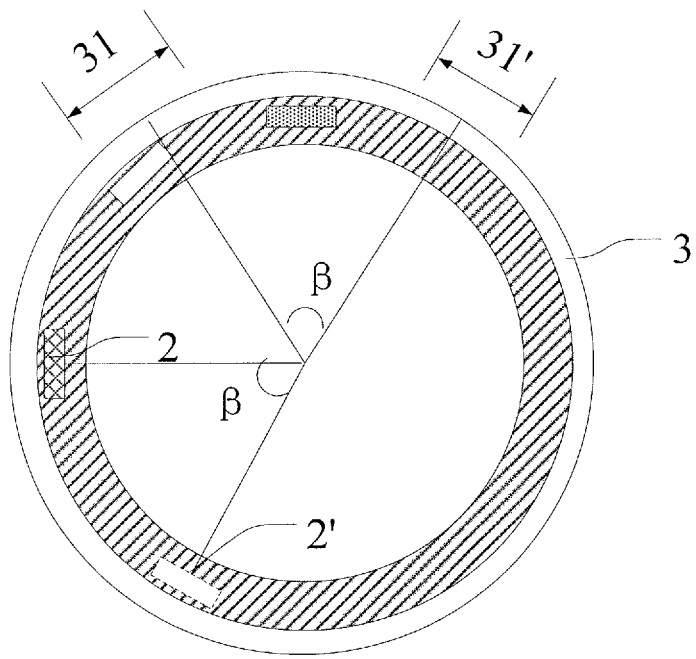
FIG. 5 is schematic diagram of determining a display position of a smart bracelet provided in an embodiment of the present disclosure.
Figure 6:
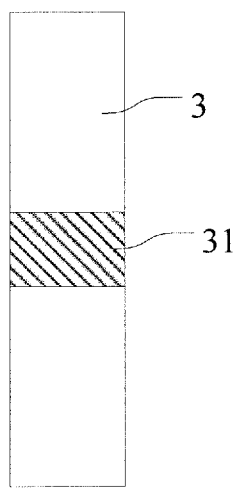
FIG. 6 is a schematic diagram of a display position in a smart bracelet provided in an embodiment of the present disclosure.

For example, referring to FIG. 5, a looked-up closest position 2' is located at a position where the current position of the three-axis accelerometer 2 rotates an angle β in counterclockwise direction. The display position corresponding to the closest position 2' is 31'. Then, the current display position 31 can be located at a position where the display position 31' rotates the angle β in counterclockwise direction, so as to form the display position as shown in FIG. 6.

For the above two manners for determining the current display position, they can either independently used or combined to determine the display position. For example, it can be determined firstly whether a distance difference between the current position information and the looked-up closest position information is within a predetermined range. If the distance difference is within the predetermined range, the display position corresponding to the closest position information in the correspondence relationship can be taken as the current display position of the displaying module; if the distance difference is not within the predetermined range, the current display position of the displaying module can be calculated and obtained according to the current position information, the closest position information and the display position corresponding to the closest position information.

Figure 7:
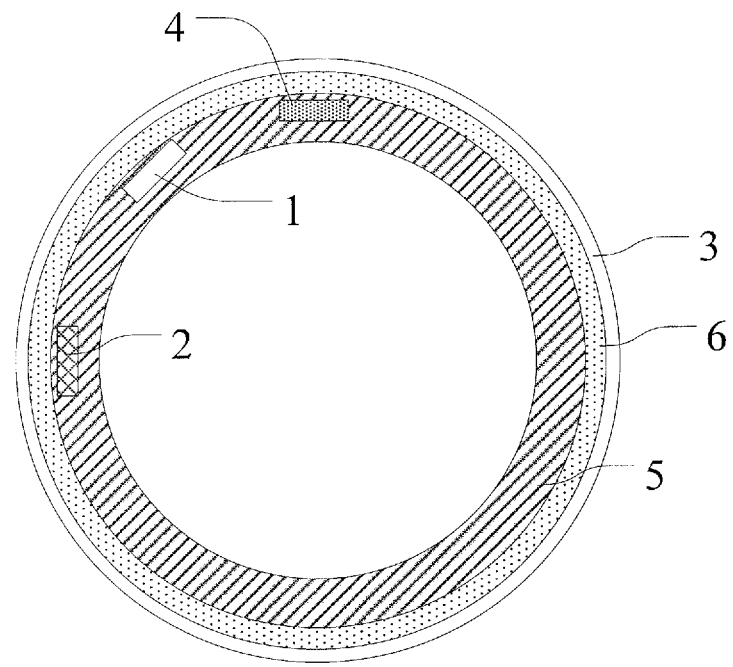
FIG. 7 is a schematic block diagram of another smart bracelet provided in an embodiment of the present disclosure.

FIG. 7 is a schematic diagram of another smart bracelet provided in an embodiment in the present disclosure. The smart bracelet comprises a processor 1, a three-axis accelerometer 2, a ring-shaped display layer 3 and a storage 4. In addition, the smart bracelet further comprises a ring-shaped touch layer 6 sheathed with the ring-shaped display layer 3. The processor 1 further comprises a correspondence relationship acquiring unit.

The three-axis accelerometer 2 is configured to detect the current position information of itself.

The storage 4 is configured to store a correspondence relationship between set position information of the three-axis accelerometer and a display position of the ring-shaped display layer 3.

The processor 1 is configured to determine a current display position of the ring-shaped display layer according to the correspondence relationship and the current position information.

The ring-shaped display layer 3 is configured to display content to be displayed according to the current display position.

The ring-shaped touch layer 6 is configured to detect touch position information of a user.

The correspondence relationship acquiring unit is configured to establish the correspondence relationship based on the current position information of the three-axis accelerometer 2 and the touch position information of the ring-shaped touch layer 6. For example, the correspondence relationship acquiring unit 5 takes the touch position information as the current display position of the ring-shaped display layer 3, and establishes the correspondence relationship by using the current position information of the three-axis accelerometer 2 and the current display position of the ring-shaped display layer 3. The touch position information is corresponding to the position information of the three-axis accelerometer at the same time in the correspondence relationship.

In the smart bracelet provided in the embodiment of the present disclosure, the user can establish a correspondence relationship between the position information of the three-axis accelerometer and the display position of the rang-shaped display layer through the ring-shaped touch layer and the correspondence relationship acquiring unit. In particular, the user touches a device surface of the smart bracelet directly towards the position of human eyes by hand, the ring-shaped touch layer senses the touch position, and the correspondence relationship acquiring unit records the touch position and the position information of the three-axis accelerometer at this time and matches the above two to establish the correspondence relationship between the position information of the three-axis accelerometer and the display position of the ring-shaped display layer. After multiple times of touching, positions of the display screen at respective angles can be matched with three-axis acceleration data, so as to form a complete correspondence relationship between the position information (of the three-axis accelerometer) and the display position information (of the ring-shaped display layer). Then, the processor can change automatically the current display position of the ring-shaped display layer according to the current position information of the position detecting module based on the above correspondence relationship, so as to facilitate the user to view the display content.

Figure 8:
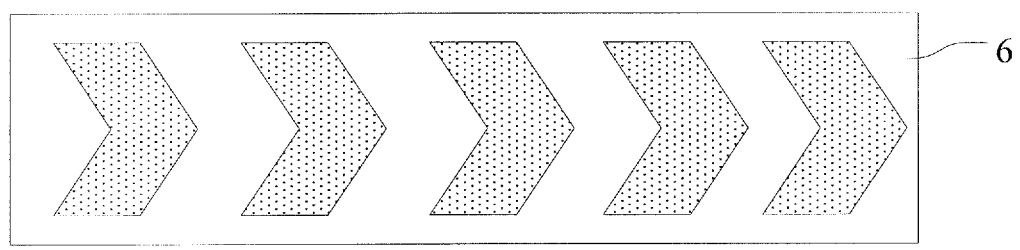
FIG. 8 is a schematic diagram of a ring-shaped touch layer provided in an embodiment of the present disclosure.

For the smart bracelet provided in the embodiment of the present disclosure, referring to FIG. 7, the ring-shaped touch layer 6 can be sheathed inside the ring-shaped display layer 3. In particular, the ring-shaped touch slider as shown in FIG. 8 can be adopted.

The smart bracelet further comprises a flexible circuit board (PCB) 5, on which the processor 1 and the three-axis accelerometer 2 are arranged. Preferably, referring to FIG. 7, the flexible circuit board 5 is ring-shaped. An inner side of the flexible circuit board has surface mounted chips, and an outer side thereof is the ring-shaped touch layer 6, that is, the ring-shaped touch layer 6 is disposed between the flexible circuit board 5 and the ring-shaped display layer 3.

The above implementations are just used to describe the present disclosure, but not used to limit the present disclosure. Those skilled in the art can make various alternations and modification without departing the spirit and scope of the present disclosure. Therefore, all equivalent technical solutions belong to the scope of the present disclosure. The patent protection scope of the present disclosure shall be defined by the claims.

The present application claims the priority of a Chinese patent application with an application No. "CN 201410505339.7" and an invention title "SMART BRACELET DISPLAY CONTROL SYSTEM AND SMART BRACELET" filed on Sep. 26, 2014. Herein, the entire content disclosed by the Chinese patent application is incorporated by reference as a part of the present disclosure.

What is claimed is:

1. A smart bracelet display control system, comprising a processor, a three-axis accelerometer, a ring-shaped display layer and a storage, wherein
the three-axis accelerometer is configured to detect current position information of the three-axis accelerometer;
the storage is configured to store a correspondence relationship between set position information of the three-axis accelerometer and a display position of the ring-shaped display layer;
the processor is configured to determine a current display position of the ring-shaped display layer according to the correspondence relationship and the current position information;
the ring-shaped display layer is configured to display content to be displayed according to the current display position, and
a ring shaped touch layer configured to detect touch position information of a user;
wherein the detected position information is a placing angle of the three-axis accelerometer, which is determined by angles between the three axes of the three-axis accelerometer and gravity acceleration and the current display position is the display position in the ring-shaped display layer of the content to be displayed,
wherein when a user touches a device surface of the smart bracelet directly towards the position of human eyes, the ring-shaped touch layer senses the touch position, and
the processor records the touch position and the position information of the three-axis accelerometer at this time, and matches the above two to establish the correspondence relationship between the position information of the three-axis accelerometer and the display position of the ring-shaped display layer.

2. The smart bracelet display control system according to claim 1, wherein the processor is further configured to:
look up set position information that matches with the current position information in the correspondence relationship; and
take a display position corresponding to the looked-up set position information as the current display position of the ring-shaped display layer.

3. The smart bracelet display control system according to claim 2, wherein the processor takes set position information closest to the current position information as the matched set position information.

4. The smart bracelet display control system according to claim 1, wherein the processor is further configured to:
look up set position information closest to the current position information in the correspondence relationship;
take the looked-up set position information as reference position information and acquire a display position corresponding to the reference position information as a reference display position; and
calculate and obtain a current display position of the ring-shaped display layer according to the current position information, the reference position information and the reference display position.

5. The smart bracelet display control system according to claim 4, wherein processor is further configured to:
calculate a relative position relationship of the current position information and the reference position information; and
calculate the current display position of the ring-shaped display layer according to the relative position relationship and the reference display position.

6. A smart bracelet, comprising a processor, a three-axis accelerometer, a ring-shaped display layer and a storage, wherein
the three-axis accelerometer is configured to detect current position information of itself;
the storage is configured to store a correspondence relationship between set position information of the three-axis accelerometer, and a display position of the ring-shaped display layer;
the processor is configured to determine a current display position of the ring-shaped display layer according to the correspondence relationship and the current position information;
the ring-shaped display layer is configured to display content to be displayed according to the current display position; and
a ring-shaped touch layer sheathed with the ring-shaped display layer configured to detect touch position information of a user;
wherein the detected position information is a placing angle of the three-axis accelerometer, which is determined by angles between the three axes of the three-axis accelerometer and gravity acceleration and the current display position is the display position in the ring-shaped display layer of the content to be displayed,
wherein when a user touches a device surface of the smart bracelet directly towards the position of human eyes, the ring-shaped touch layer senses the touch position, and
the processor records the touch position and the position information of the three-axis accelerometer at this time, and matches the above two to establish the correspondence relationship between the position information of the three-axis accelerometer and the display position of the ring-shaped display layer.

7. The smart bracelet according to claim 6, wherein the processor is further configured to:
look up set position information that matches with the current position information in the correspondence relationship; and take a display position corresponding to the looked-up set position information as the current display position of the ring-shaped display layer.

8. The smart bracelet according to claim 7, wherein the processor takes set position information closest to the current position information as the matched set position information.

9. The smart bracelet according to claim 6, wherein the processor is further configured to:
- look up set position information closest to the current position information in the correspondence relationship;
- take the looked-up set position information as reference position information and acquire a display position corresponding to the reference position information as a reference display position; and
- calculate and obtain the current display position according to the current position information, the reference position information and the reference display position.

10. The smart bracelet according to claim 9, wherein the processor is further configured to:
- calculate a relative position relationship of the current position information and the reference position information; and
- calculate the current display position according to the relative position relationship and the reference display position.

11. The smart bracelet according to claim 6, further comprising a flexible circuit board, on which the processor and the three-axis accelerometer are arranged.

12. The smart bracelet according to claim 11, wherein the flexible circuit board is ring-shaped, and the ring-shaped touch layer is disposed between the flexible circuit board and the ring-shaped display layer.

* * * * *